(12) United States Patent
Steiner et al.

(10) Patent No.: US 11,383,186 B2
(45) Date of Patent: Jul. 12, 2022

(54) FILTER

(71) Applicant: Filtration Group GmbH, Oehringen (DE)

(72) Inventors: Gerhard Steiner, Pfedelbach-Unterhoefen (DE); Gernot Hesse, Oehringen (DE); Wilhelm Schoepp, Altlussheim (DE)

(73) Assignee: FILTRATION GROUP GMBH

( * ) Notice: Subject to any disclaimer, the term of this patent is extended or adjusted under 35 U.S.C. 154(b) by 133 days.

(21) Appl. No.: 16/789,411

(22) Filed: Feb. 12, 2020

(65) Prior Publication Data

US 2020/0261830 A1 Aug. 20, 2020

(30) Foreign Application Priority Data

Feb. 14, 2019 (DE) .......................... 102019201991.9

(51) Int. Cl.
*B01D 29/96* (2006.01)
*B01D 29/13* (2006.01)

(52) U.S. Cl.
CPC ............ *B01D 29/96* (2013.01); *B01D 29/13* (2013.01); *B01D 2201/291* (2013.01); *B01D 2201/302* (2013.01); *B01D 2201/4076* (2013.01)

(58) Field of Classification Search
CPC .. B01D 29/96; B01D 29/13; B01D 2201/291; B01D 2201/302; B01D 2201/4076; B01D 29/21; B01D 29/58; B01D 35/147; B01D 29/54; B01D 2201/24; B01D 2201/295; B01D 2201/4038; B01D 29/11; B01D 29/50; B01D 35/18; B01D 2201/29;
(Continued)

(56) References Cited

U.S. PATENT DOCUMENTS 5,676,273 A 10/1997 Jonkers et al.

FOREIGN PATENT DOCUMENTS

| DE | 2256463 A1 | 11/1972 | |
| DE | 10 2016 202 000 A1 | 8/2017 | |
| DE | 102016202000 A1 * | 8/2017 | ............. B01D 29/50 |

(Continued)

OTHER PUBLICATIONS

English machine translation of DE102016202000A1 (Aug. 2017).*
(Continued)

*Primary Examiner* — Madeline Gonzalez
(74) *Attorney, Agent, or Firm* — Fishman Stewart PLLC (57) ABSTRACT

A filter element group for a filter device for filtering a fluid may include a ring-shaped working filter element, a ring-shaped protective filter element, an assembly device, and a securing device. The working filter element may include a ring-shaped working filter body, a first outer end plate, and a second outer end plate. The protective filter element may include a ring-shaped protective filter body, a first inner end plate, and a second inner end plate. The securing device may be adjustable between a securing state where the cover plate is axially secured to the second outer end plate and a release state where the cover plate is axially removable from the second outer end plate. When in the securing state, the securing device may secure the cover plate to the second outer end plate preventing rotation of the cover plate in the circumferential direction.

24 Claims, 7 Drawing Sheets

(58) Field of Classification Search
CPC .......... B01D 2201/40; B01D 2201/301; Y02E
10/72; F03D 80/70; F16N 39/06
USPC ..... 210/232, 314, 315, 337, 338, 493.2, 450
See application file for complete search history.

(56) References Cited

FOREIGN PATENT DOCUMENTS

EP          3078406 A1    10/2016
WO     2008/143619 A1    11/2008

OTHER PUBLICATIONS

EP Search Report dated Apr. 17, 2020 for copending European Patent Application No. EP 20153734.
English abstract DE-10 2016 202 000.
English abstract for DE-2256463.

* cited by examiner

FILTER

CROSS-REFERENCE TO RELATED APPLICATIONS

This application claims priority to German Patent Application No. DE 10 2019 201 991.9, field on Feb. 14, 2019, the contents of which are hereby incorporated by reference in their entirety.

TECHNICAL FIELD

The present invention relates to a filter element group for a filter device for filtering a fluid.

BACKGROUND

A generic filter element group is known from DE 10 2016 202 000 A1 and comprises a ring-shaped working filter element, a ring-shaped protective filter element, an assembly device, and a securing device. The working filter element has a ring-shaped working filter body, a first outer end plate, and a second outer end plate. The working filter body can be flown through radially by the fluid, encloses a working filter interior in the circumferential direction, supports the first outer end plate on its first axial end, and supports the second outer end plate on its second axial end. The protective filter element is arranged in the working filter interior, thus in the interior of the working filter element, and has a ring-shaped protective filter body, a first inner end plate, and a second inner end plate. The protective filter body can be flown through radially by the fluid, encloses a protective filter interior in the circumferential direction, supports the first inner end plate on its first axial end, and supports the second inner end plate on its second axial end. The first outer end plate is designed as open end plate and has a fluid outlet opening of the filter element group, through which the filtered fluid flows out of the filter element group. The first inner end plate is designed as open end plate and has a connecting opening. The first inner end plate is further arranged on the first outer end plate in such a way that the protective filter interior is fluidically connected to the fluid outlet opening through the connecting opening. In other words, the filtered fluid can flow out of the protective filter interior through the connecting opening and out of the filter element group through the fluid outlet opening during operation of the respective filter device.

The second outer end plate is also designed as open end plate and has an assembly opening, through which the protective filter element can be inserted into the internal workspace and can be removed therefrom. The assembly device has a cover plate and a connecting rod, wherein the cover plate has an annular area, which is circumferential in the circumferential direction and which abuts axially on the outside of the second outer end plate. The second inner end plate is designed as closed end plate and is connected in a tension-resistant as well as pressure-resistant manner to the cover plate via the connecting rod. The securing device can be adjusted between a securing state, in which the cover plate is secured to the second outer end plate against being removed in the axial direction, and a release state, in which the cover plate can be axially removed from the second outer end plate.

In the case of the known filter element group, the securing device is designed as clip connection or as bayonet joint. The clip connection has a plurality of clip elements, which protrude axially on the outer circumference of the cover plate and can thereby be made to engage with catch contour protruding radially from the second outer end plate. To separate this clip connection, the cover plate and the second outer end plate can be rotated relative to one another in the circumferential direction. The catch contours have ramps, which make it possible to move the catch contours out of the clip elements in the circumferential direction. In the case of the bayonet joint, journals protruding radially to the outside are formed on the second outer end plate, while, on an axially protruding circumferential edge of the cover plate, corresponding guide grooves are formed, into which the respective journal can be inserted axially and can be fixed in the respective guide groove by means of a rotation of the cover plate relative to the second outer end plate.

So that the securing device cannot automatically transfer from the securing state into the release state during the operation of the filter element group in the case of the known filter element group, the holding forces within the clip connection or within the bayonet joint, respectively, have to be selected relatively high to prevent an automatic rotation between cover plate and second outer end plate. This makes the assembly and in particular the disassembly for changing the working filter element more difficult. In particular when, after a longer use of the filter element group, the working filter element is to be replaced in the course of a maintenance interval, because it is possible during the operation of the filter device that impurities accumulate and adhere between cover plate and second outer end plate and can thus create an additional resistance against a rotation between cover plate and second outer end plate.

SUMMARY

The present invention deals with the problem of specifying an improved embodiment for a filter element group of the above-described type, which is in particular characterized by a simplified assembly, in particular during maintenance.

This problem is solved according to the invention by means of the subject matter of the independent claim(s). Advantageous embodiments are subject matter of the dependent claim(s).

The invention is based on the general idea of designing the securing device in such a way that, in the securing state, it secures the cover plate to the second outer end plate against a rotation in the circumferential direction. Due to the fact that the securing device itself can now prevent the rotation between cover plate and second outer end plate, an automatic rotation between cover plate and second outer end plate can be ruled out. In particular the assembly and the disassembly of the filter element group can be significantly simplified thereby.

According to an advantageous embodiment, the securing device can have a securing element, which is separate with respect to the cover plate and with respect to the second outer end plate and which can be adjusted between a securing position and a release position. This securing element assumes its securing position in the securing state, while it assumes its release position in the release state. The adjustment of the securing element further takes place relative to the cover plate and relative to the outer end plate. With the help of the securing element, the securing device has an additional component, which is adjustably arranged on the remaining filter element group. The securing state and the release state can be established easily in this way.

An embodiment is particularly advantageous, in the case of which the securing device has at least one axial through opening on the cover plate in the annular area, while on the second outer end plate, the securing device hast least one axially protruding protrusion, which protrudes axially into the respective through opening or protrudes through it. The respective protrusion and the corresponding through opening are thereby adjusted to one another in such a way that they cooperate in the securing state in such a way that the cover plate on the second outer end plate is thereby secured against a rotation in the circumferential direction. In other words, the protrusion engaging with the corresponding through opening effects a positive connection in the circumferential direction, which mechanically blocks a rotation between cover plate and second outer end plate.

According to a further development, the securing element can cooperate with the respective protrusion in the securing position on an outer side of the cover plate facing away from the second outer end plate, and can secure said protrusion against being pulled out of the respective through opening. In other words, the securing element cooperates with the protrusion, which is inserted through the corresponding through opening, in the securing position in such a way that the cover plate can no longer be removed from the second outer end plate in the axial direction. The protrusion inserted into the through opening simultaneously effects the protection against rotation between cover plate and second outer end plate.

A further development is particularly advantageous, in the case of which the respective protrusion has a radial securing opening, wherein the securing element has at least one securing pin, which engages with the securing opening or engages through it in the securing position on the outer side of the cover plate. A positive connection between securing pin and protrusion, which prevents the protrusion from being pulled out of the through opening, is realized in this way in the securing position. For this purpose, the respective securing pin is dimensioned to be larger than the second through opening in the radial direction, so that the securing pin cannot be guided axially through the through opening, when it is inserted into the respective securing opening.

Exactly two through openings of this type are advantageously provided, which are arranged on the cover plate so as to be located diametrically opposite one another.

Exactly two protrusions of this type are advantageously also provided, which are arranged on the second outer end plate so as to be located diametrically opposite one another. The securing against rotation and/or against an axial removal of the cover plate relative to the second outer end plate can be effectively improved thereby. In the case of another embodiment, more than two through openings as well as more than two protrusions can generally also be provided, which are then generally arranged so as to be distributed arbitrarily, preferably uniformly, in the circumferential direction.

In the case of another further development, the securing element can have exactly two securing pins of this type, which in each case cooperate with one of the protrusions in the securing position and engage with the securing opening thereof or engage through it. The securing against an axial removal of the cover plate from the second outer end plate can be significantly improved thereby. It is generally also conceivable here to equip the securing element with three or more securing pins.

According to a particularly advantageous embodiment, the securing element can be secured to the cover plate in the release position in such a way that the cover plate can be removed from the second outer end plate by means of the securing element. The securing element thereby attains an additional function, which significantly improves the handling of the filter element group in response to the assembly or in response to the disassembly, respectively, in particular during maintenance.

According to a further development, the cover plate can have at least one axially protruding holder, with which the securing element cooperates in the release position to secure the securing element to the cover plate. This simplifies the practicability of the embodiment, in the case of which the securing element simplifies the handling of the filter element group in the release position In the case of an advantageous embodiment, the respective holder can have a radial holding opening, wherein the securing element has at least one securing pin, which engages with the holding opening or engages through it in the release position. A positive cooperation between securing element and the respective holder is thereby realized, whereby in particular comparatively high holding forces can be transferred.

In the case of an advantageous further development, exactly two holders of this type can be provided, which are arranged so as to be located diametrically opposite one another on the cover plate. The forces, which can be transferred between securing element and cover plate, can also be significantly increased thereby. In the case of another embodiment, three or more holders of this type can also be provided, which are then generally arranged so as to be distributed arbitrarily, but preferably uniformly, in the circumferential direction.

An embodiment is also preferred here, in the case of which the securing element has exactly two securing pins of this type, which in each case cooperate with one of the holders and which engage with the holding opening thereof or engage through it in the release position. The positive connection between securing element and cover plate is improved in this way. It is also generally conceivable there that three or more securing pins are embodied on the securing element.

In the case of the embodiments, in which the securing element has exactly two securing pins, it can advantageously be provided that the securing element has a bracket, the ends of which each form a securing pin of this type. The securing element can thereby be produced particularly easily and thus cost-efficiently, for example of a correspondingly curved metal wire. The ends can thereby be angled from the bracket to form the respective securing pin.

In the case of an embodiment, in which a protrusion of this type comprising through openings is provided, the respective securing pin of the securing element can be inserted into the respective securing opening in the securing position. In the case of an embodiment, in which a bracket of this type comprising holding opening is provided, the same securing pin of the securing element can be inserted into this holding opening in the release position. This means that the respective securing pin of the securing element can optionally be inserted into the through opening of the respective protrusion for the securing position and into the respective holding opening of the respective holder for the release position.

Provided that exactly two securing pins, which are connected to one another via a bracket, are embodied on the securing element, the two securing pins can advantageously be oriented in such a way that they define a pivot axis, about which the securing element is supported on the protrusions or on the holders, respectively, so as to be pivotable between a working position and a resting position. In the working position, the entire filter element group can be lifted on the bracket, when the securing element assumes the securing position, thus when the securing pins cooperate with the protrusions. In contrast, when the securing element assumes the release position, thus when the securing pins cooperate with the holders, the assembly device with the protective filter element can be lifted on the bracket in the working position of the securing element. In the resting position, in contrast, the bracket bears on the annular area of the cover plate, namely in the securing position as well as in the release position. The bracket of the securing element can advantageously be formed in such a way that it remains radially within a radial outer circumference of the annular area or of the cover plate, respectively, in the resting position. In the resting position, the bracket thus does not form an interference contour, which protrudes radially beyond the outer contour of the filter element group.

In the case of an embodiment, in which at least one protrusion of this type and at least one holder of this type are provided, it can advantageously be provided that the respective holder is arranged offset with respect to the respective through opening in the circumferential direction.

Another further development proposes that the securing element engages with the protrusions in the securing position, while the securing element engages with the holders in the release position. It can advantageously also be provided that the securing element can be manually transferred from the securing position into the release position and from the release position into the securing position. Provided that the securing element has a bracket, the ends of which are formed by the securing pins, the securing pins can be moved out of the securing openings or out of the holding openings, respectively, by means of elastic deformation of the bracket.

Another embodiment proposes that the working filter body extends continuously from the first outer end plate to the second outer end plate. The working filter element thus only has a single, continuous filter body.

In the case of an alternative embodiment, in contrast, it can be provided that the working filter body has a ring-shaped main filter body and a ring-shaped fine filter body, wherein the main filter body extends from the first outer end plate to an intermediate plate, while the fine filter body extends from this intermediate plate to the second outer end plate. In the case of this embodiment, the working filter element thus has two separate filter bodies, which are firmly connected to one another via the intermediate plate. Main filter bodies and fine filter bodies advantageously have different filter materials comprising different filter fineness. The fine filter body is advantageously designed to filter out smaller impurities, while the main filter body is advantageously designed to filter out coarser impurities. In contrast, the protective filter body is designed to filter out comparatively coarse impurities. A main flow filtration, which occurs through the main filter body, and a bypass flow filtration, which occurs through the fine filter body, can be realized by means of the two filter bodies within the working filter body.

In the case of another embodiment, a spacer device, which encloses the working filter element in the circumferential direction and which protrudes radially to the outside on the working filter element and through which fluid can flow axially between its radial inner circumference and its radial outer circumference, can be arranged on the outside of the working filter body, axially between the first outer end plate and the second outer end plate. The working filter element can be supported radially, for example in a cylindrical housing of the respective filter device with the help of this spacer device, without thereby blocking an annular space, which encloses the filter element group in the circumferential direction in the axial direction in this filter housing.

Radially on the inside, the spacer device can be supported, for example, directly on the outer contour of the working filter body. Provided that the working filter body is divided into the main filter body and the fine filter body, the spacer device can advantageously be supported radially on the inside on the intermediate plate.

The spacer device can generally be formed integrally on the intermediate plate and can thereby have a plurality of spacer elements, which are distributed in the circumferential direction and which protrude radially to the outside from the intermediate plate. These spacer elements can be designed, for example, as webs, which each extend radially and axially.

In the alternative, the spacer device can have an elastic ring, which is separate with respect to the working filter element, and a plurality of separate spacer elements, which are threaded onto the ring and which are supported radially on the working filter element. The elastic ring is thereby advantageously dimensioned in such a way that it radially biases the spacer elements against the working filter element. A secure positioning of the spacer elements on the working filter element is realized thereby.

The connecting rod of the assembly device can advantageously be designed as pipe. This pipe can preferably have a perforated pipe wall, so as to provide for a pressure compensation between a pipe interior and the working filter interior. The connecting rod can be inseparably connected to the cover plate and/or to the second inner end plate, for example via at least one welded connection. In the alternative, separable connections are also conceivable, such as, for example, catch connections or clip connections. The connecting rod can be embodied in one piece, so that it extends continuously from the cover plate to the second inner end plate. A multi-piece connecting rod is likewise conceivable, wherein the individual connecting rod pieces can then be fastened to one another again in an inseparable or separable manner.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically.

DETAILED DESCRIPTION

Figure 1:
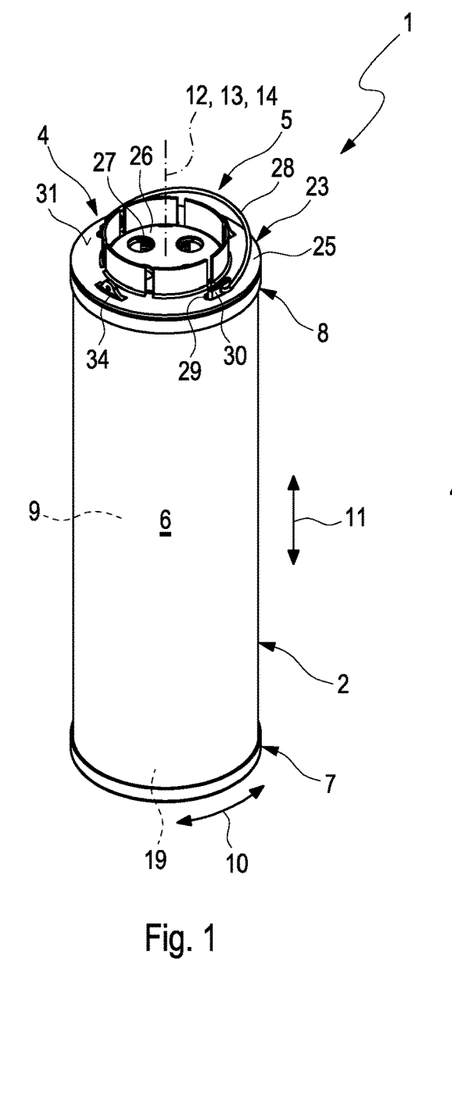
FIG. 1 shows an isometric view of a filter element group in the assembled state.
Figure 2:
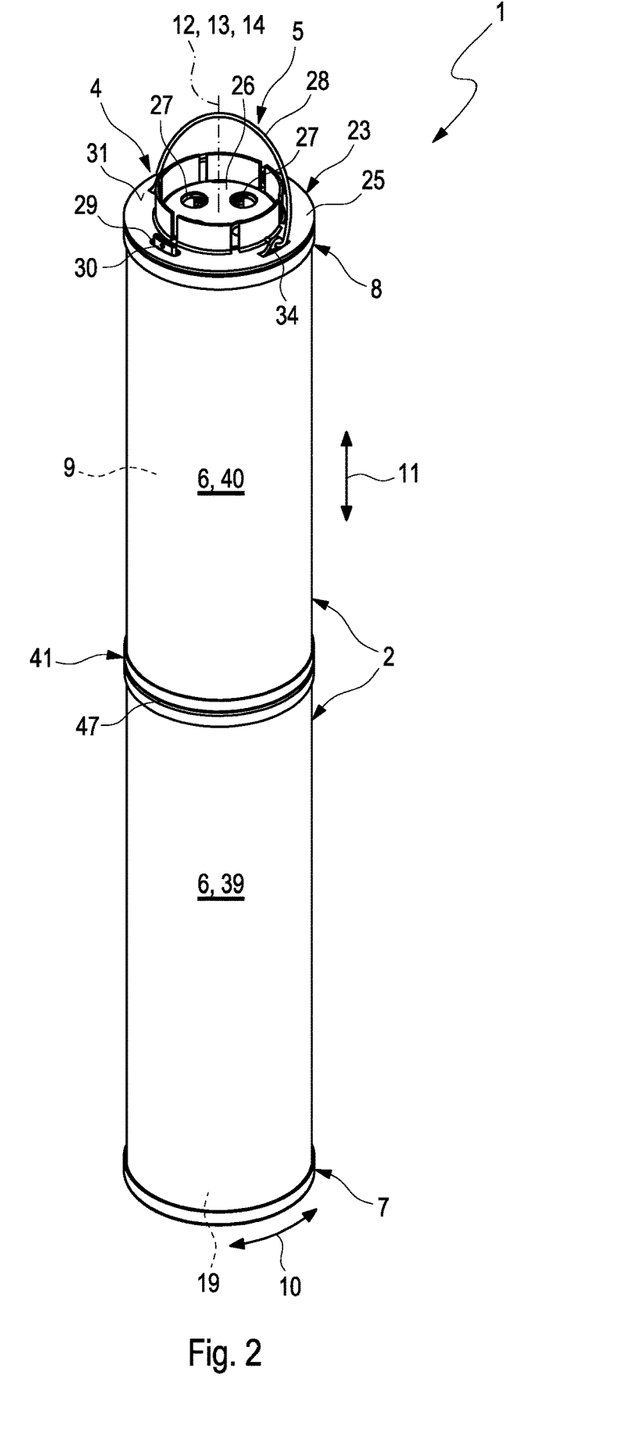
FIG. 2 shows an isometric view of the filter element group in the assembled state, but in the case of a different embodiment.
Figure 3:
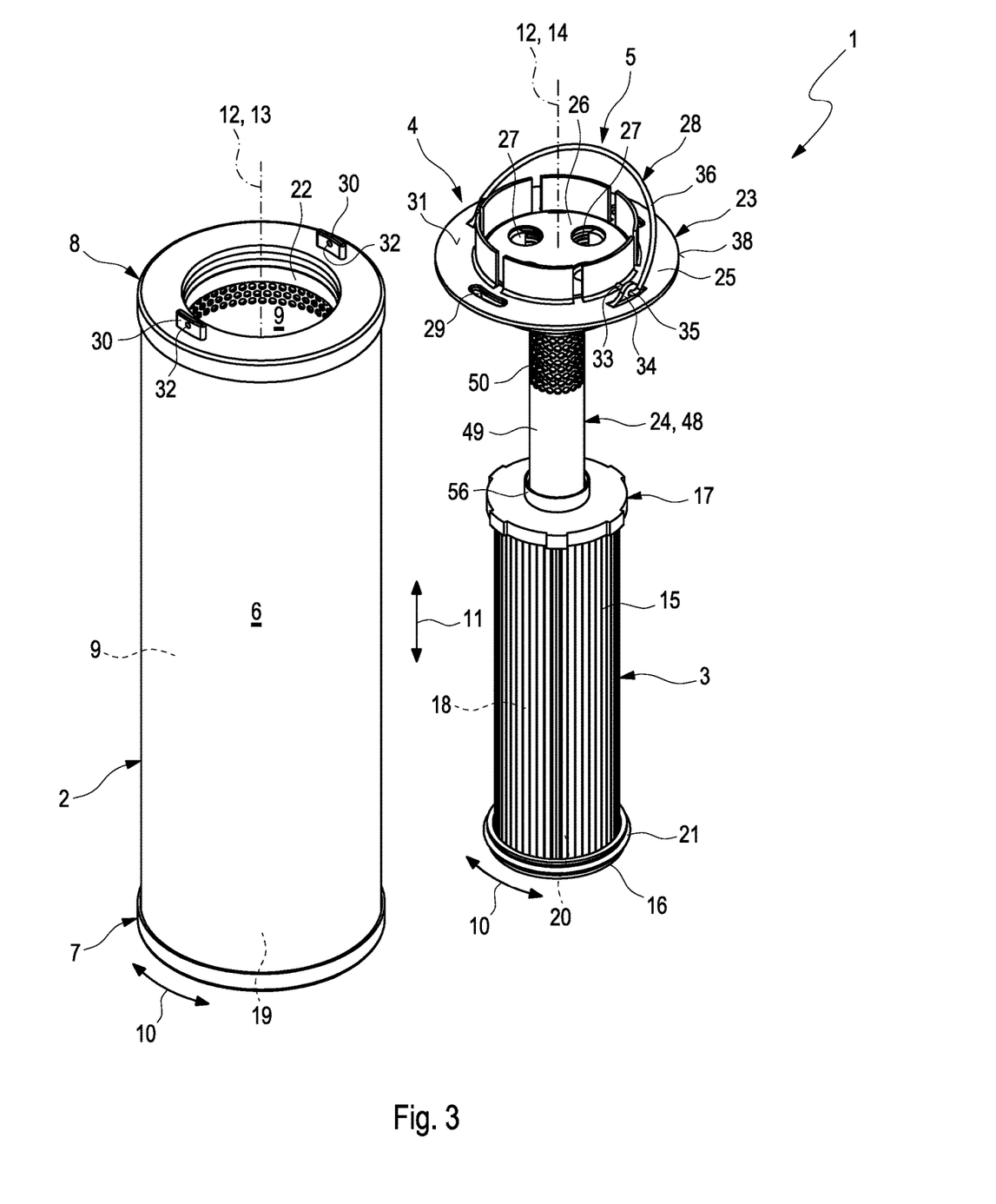
FIG. 3 shows an isometric view of the filter element group from FIG. 1, but in the disassembled state.
Figure 8:
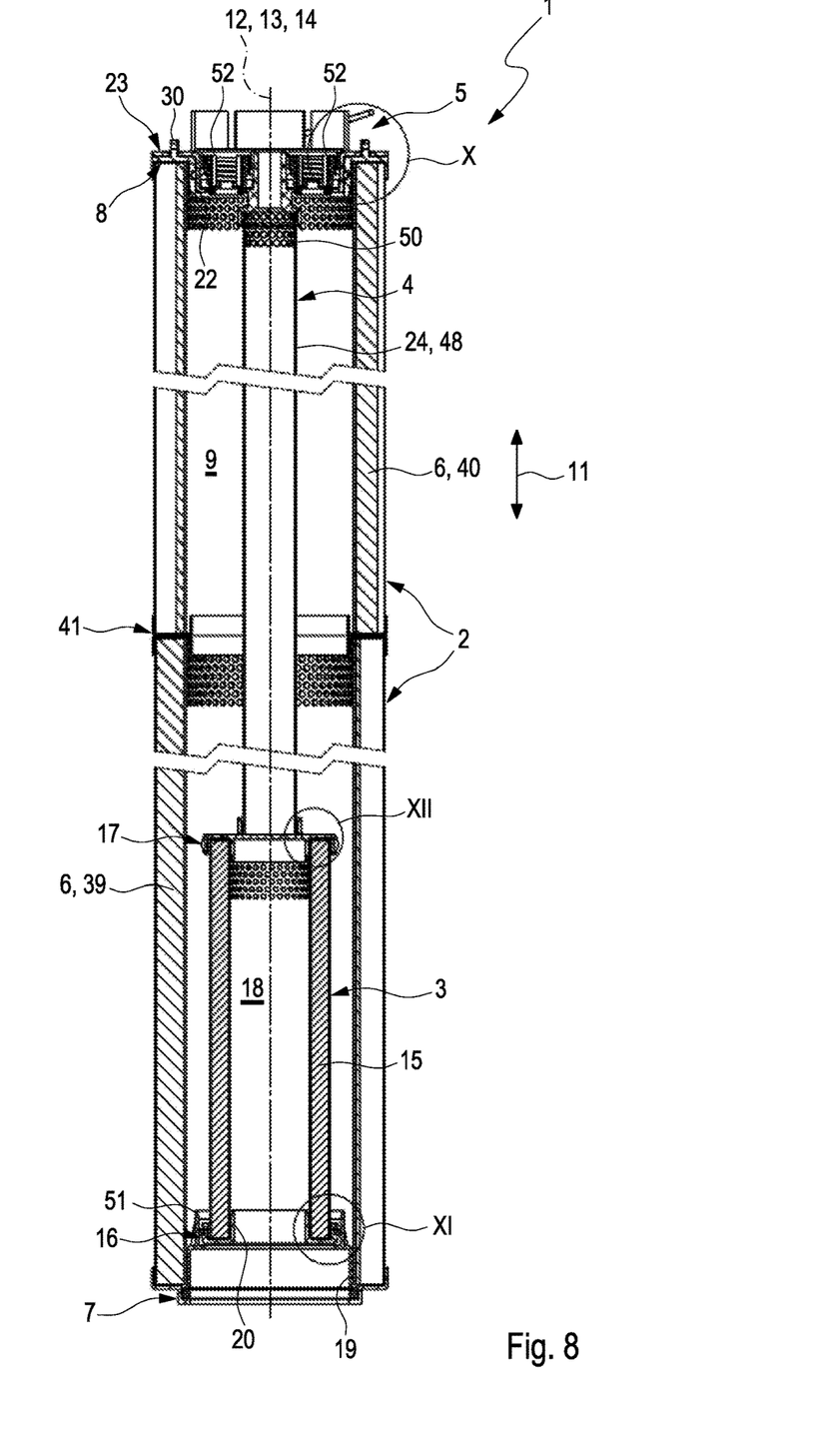
FIG. 8 shows a longitudinal section, which is shortened in the longitudinal direction, through the filter element group from FIG. 2 in the assembled state according to sectional lines VIII in FIG. 9.

According to FIGS. 1 to 3, a filter element group 1 comprises a ring-shaped working filter element 2, which is arranged on the outside in the assembled state of the filter element group 1, which is shown in FIGS. 1, 2, and 8. The filter element group 1 further comprises a ring-shaped protective filter element 3, which is visible in the sectional view of FIG. 8 and in the disassembled state of the filter element group 1, which is shown in FIG. 3, and which is arranged on the inside, thus in the interior of the working filter element 2, in the assembled state of FIGS. 1, 2, and 8. The filter element group 1 further comprises an assembly device 4 and a securing device 5. The filter element group 1 is suitable for a use in a filter device for filtering a fluid. The fluid is preferably a liquid and further preferably a coolant-lubricant, in particular a cooling-lubricant oil. The filter device, which is equipped with at least one, preferably a plurality of filter element groups of this type, is used, for example, in the case of a wind turbine.

According to FIGS. 1 to 3 and 8, the working filter element 2 has a ring-shaped working filter body 6, a lower or first outer end plate 7, and an upper or second outer end plate 8. The working filter body 6 can be flown through radially by fluid to be cleaned and encloses a working filter interior 9 in the circumferential direction 10 for this purpose. With respect to the filter element group 1 or with respect to the working filter element 2, respectively, and the protective filter element 3, the axial direction 11 is defined by the longitudinal central axis 12 of the filter element group 1, which coincides with the longitudinal central axis 13 of the working filter element 2 and with the longitudinal central axis 14 of the protective filter element 3 in the assembled state of FIGS. 1, 2, and 8. The axial direction 11 extends parallel to the respective longitudinal central axis 12, 13, 14 and is suggested by a double arrow in the figures. The circumferential direction 10 is circumferential with respect to the respective longitudinal central axis 12, 13, 14 and is suggested by means of a double arrow in the figures. The radial direction extends perpendicular to the axial direction.

On its lower or first axial end, the working filter body 6 supports the first outer end plate 7, while it supports the second outer end plate 8 on its upper or second axial end. The outer end plates 7, 8 are usually adhered to the respective axial end of the working filter body 6. In the conventional manner, the working filter body 6 has a filter material structure, which is selected for the respective filtration task.

According to FIGS. 3 and 8, the protective filter element 3 has a ring-shaped protective filter body 15, a lower or first inner end plate 16 as well as an upper or second inner end plate 17. The respectively fluid can also flow radially through the protective filter body 15 and thereby encloses a protective filter interior 18 in the circumferential direction 10. On its lower or first axial end, the protective filter body 15 further supports the first inner end plate 16, while it supports the second inner end plate 17 on its upper or second axial end. An adhesive connection is advantageously also provided between the respective inner end plate 16, 17 and the respective axial end of the protective filter body 15.

Figure 11:
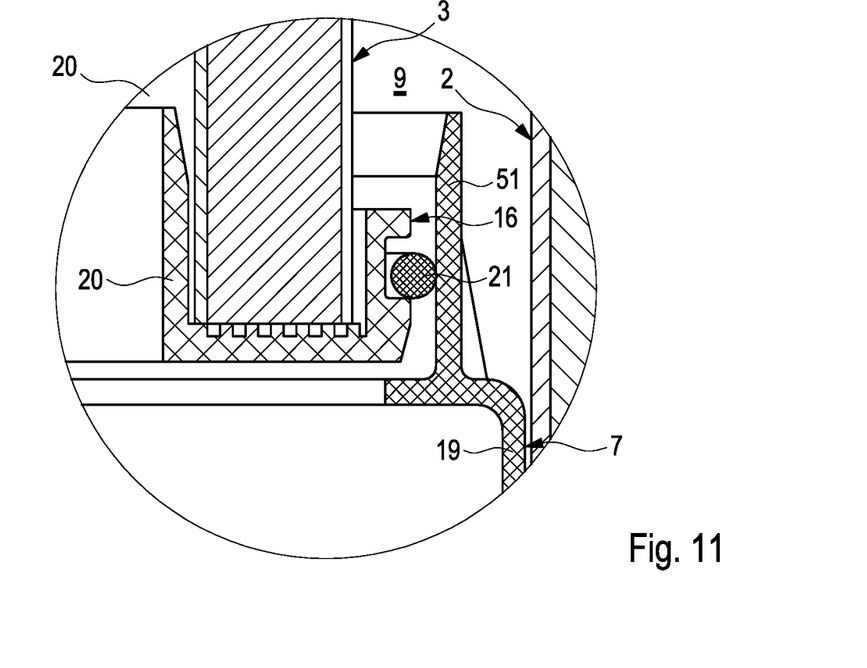
FIG. 11 shows an enlarged detail XI from FIG. 8.

The first outer end plate 7 is designed as open end plate, so that it has a central opening, which forms a fluid outlet opening 19 of the filter element group 1. The first inner end plate 16 is also designed as open end plate, so that it has a central opening, which forms a connecting opening 20. In the assembled state of FIGS. 1, 2, and 8, the protective filter element 3 is inserted into the working filter element 2 in such a way that the first inner end plate 16 is arranged on the first outer end plate 7, namely in such a way that the protective filter interior 18 is fluidically connected to the fluid outlet opening 19 by means of the connecting opening 20. According to FIGS. 8 and 11, the first inner end plate 16 can for example be inserted axially into a ring collar 51 for this purpose, which is arranged on an inner side of the first outer end plate 7 facing the working filter interior 9 and thereby encloses the fluid outlet opening 19. The first inner end plate 16 is thereby sealed against the first outer end plate 7, in particular against the mentioned ring collar 51. For this purpose, the first inner end plate 16 can have, for example, a seal 21, which can be seen in FIGS. 3, 8, and 11, and which can in particular be designed as radial seal and which can cooperate with said ring collar 51.

Figure 10:
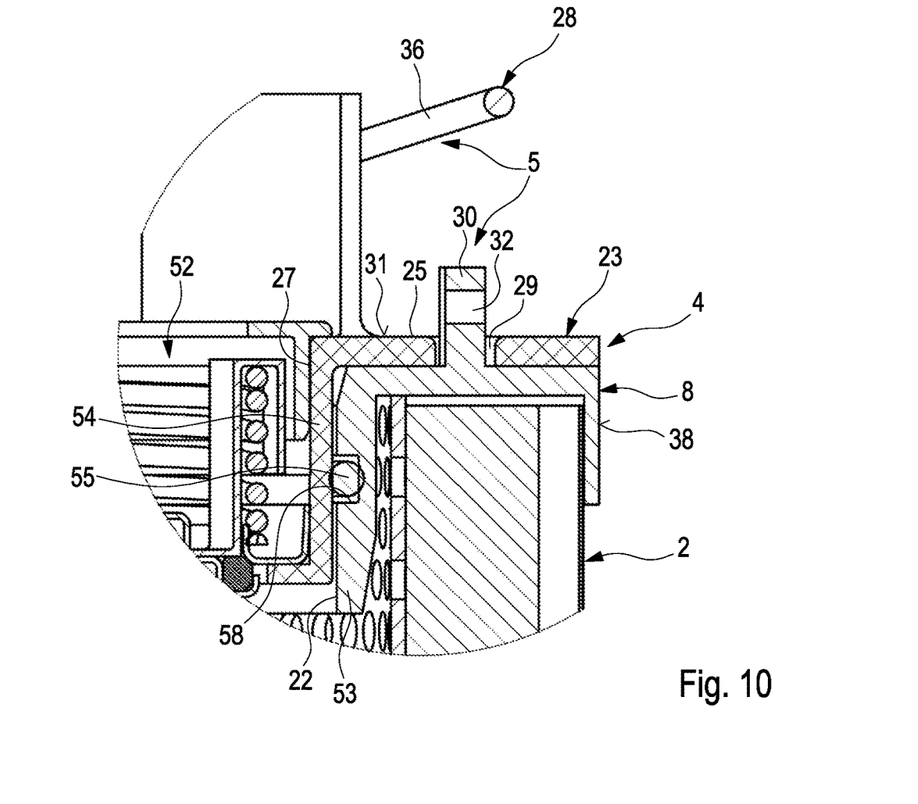
FIG. 10 shows an enlarged detail X from FIG. 8.

The second outer end plate 8 is also designed as open end plate and has a central opening, which forms an assembly opening 22. The assembly opening 22 is dimensioned in such a way that the protective filter element 3 can be inserted through the assembly opening 22 into the working filter interior 9 and can also be removed therefrom again. To assemble the filter element group 1, the protective filter element 3 is inserted through the assembly opening 22 into the working filter element 2. For the disassembly, the protective filter element 3 is removed through the assembly opening 22 from the working filter element 2. The assembly device 4 is used in response to the assembly and disassembly. Said assembly device has a cover plate 23 and a connecting rod 24. The cover plate 23 has an annular area 25, which is circumferential in the circumferential direction 10, and a core area 26, which is enclosed by the annular area 25. This core area 26 optionally has at least one receiving opening 27, which can be provided, for example, for the assembly of a relief valve 52, which is shown in FIGS. 8 and 10. In the case of the example shown here, four receiving openings 27 of this type are provided in the core area 26, so that a plurality of relief valves 52 can generally be assembled. It is likewise conceivable to use at least one of the receiving openings 27 to assemble a pressure sensor or the like.

In the assembled state of FIGS. 1, 2, and 8, the cover plate 23 abuts axially on the second outer end plate 8 with its annular area 25. The second inner end plate 17 is designed as closed end plate, so that, in contrast to an open end plate, said closed end plate tightly closes the interior of the corresponding filter body, here thus the protective filter interior 18, on the respective axial end. The second inner end plate 17 is connected to the cover plate 23 in a tension-resistant and pressure-resistant manner via the connecting rod 24. Compressive forces and tensile forces can accordingly be transferred between the cover plate 23 and the second inner end plate 17 via the connecting rod 24. For this purpose, the connecting rod 24 can be welded or clipped or screwed or riveted to the second inner end plate 17 and/or to the cover plate 23 or can be firmly connected thereto in another suitable way.

Figure 4:
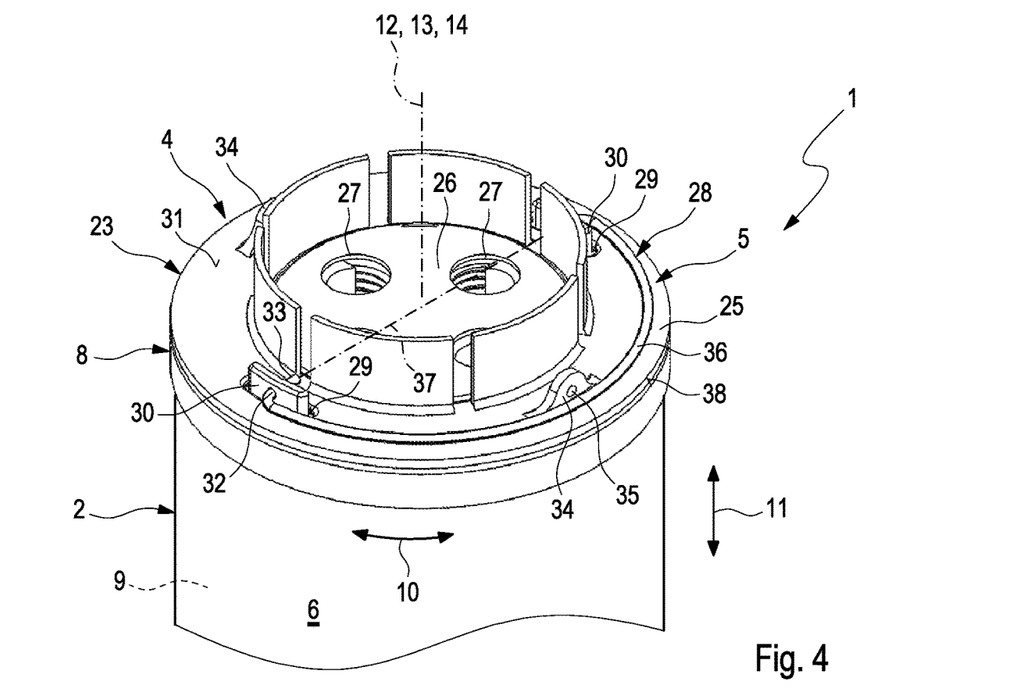
FIG. 4 shows an isometric view of the filter element group in the area of a cover plate in the securing state.

The securing device 5 can be adjusted between a securing state, which is shown in FIGS. 1 and 4, and a release state, which is shown in FIGS. 2, 3, 5, 8, and 9. In the securing state, the securing device 5 secures the cover plate 23 to the second outer end plate 8 against being removed in the axial direction 11. In the release state, in contrast, the securing device 5 allows for an axial removal of the cover plate 23 from the second outer end plate 8. In other words, the filter element group 1 can be disassembled or assembled, respectively, in the release state. In the securing state, in contrast, the assembled state is secured. The securing device 5 is furthermore designed in such a way here that it secures the cover plate 23 to the second outer end plate 8 against a rotation in the circumferential direction 10 in the securing state. In other words, the cover plate 23 and the second outer end plate 8 cannot be rotated relative to one another in the securing state.

Figure 5:
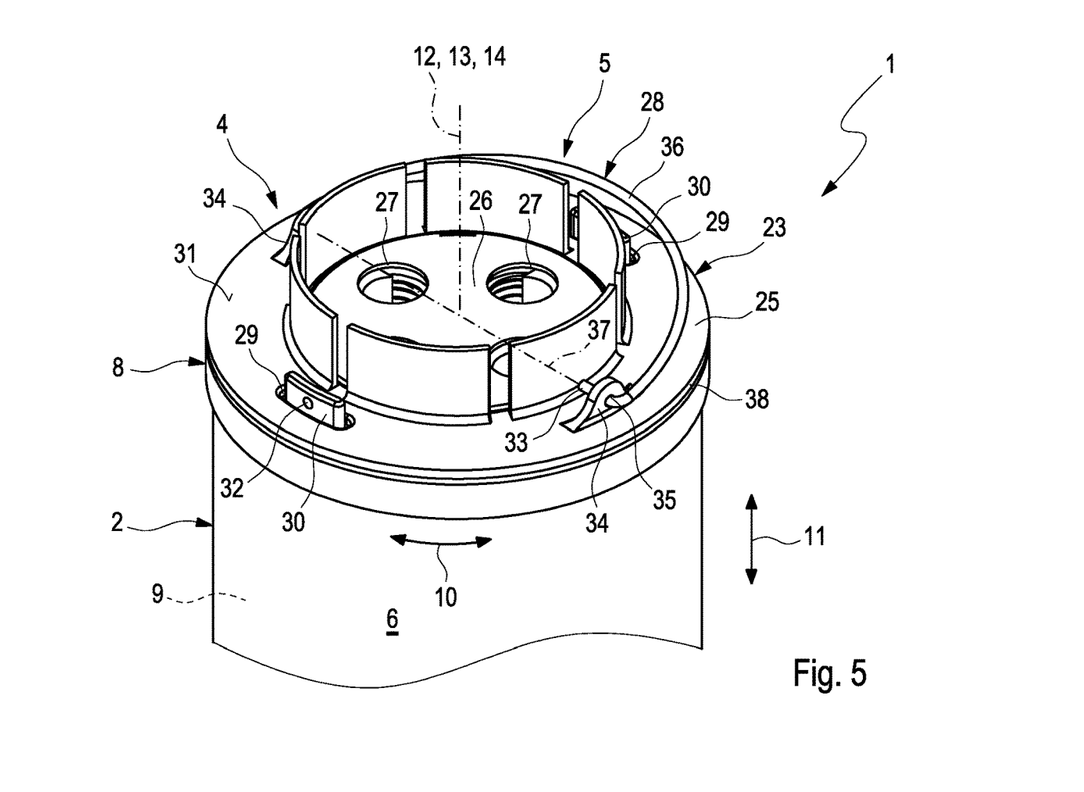
FIG. 5 shows an isometric view as in FIG. 4, but in the release state.

The securing device 5 will be described in more detail below on the basis of FIGS. 4 and 5 as well as 9 and 10, whereby the corresponding features are also present and visible in FIGS. 1 to 3 and 8. According to the preferred embodiment shown here, the securing device 5 can have a securing element 28, which represents a component, which is separate with respect to the cover plate 23 and with respect to the second outer end plate 8. This securing element 28 can be adjusted between a securing position shown in FIGS. 1 and 4, and a release position shown in FIGS. 2, 3, 5, and 8 to 10. This adjustment thereby takes place relative to the cover plate 23 and relative to the second outer end plate 8. The securing element 28 assumes its securing position in the securing state or defines the securing state with its securing position, respectively. The securing element 28 further assumes its release position in the release state or defines the release state with its release position, respectively. For this purpose, the securing device 5 can have at least one axial through opening 29 on the cover plate 23 in the annular area 25. In the case of the exemplary embodiment shown here, exactly two through openings 29 of this type are provided, which are located diametrically opposite one another. The securing device 5 can further have at least one axially protruding protrusion 30 on the second outer end plate 8, which protrudes into the respective through opening 29 or protrudes through it, respectively, in the assembled state. In the case of the example shown here, exactly two protrusions 30 of this type are provided, which are located diametrically opposite one another. In the assembled state of FIGS. 1, 2, 4, 5, and 8 to 11, each protrusion 30 thereby protrudes through a through opening 29. The inner contour of the respective through opening 29 is adjusted to the outer contour of the respective protrusion 30 in such a way that the respective protrusion 30 forms a positive protection against rotation in the assembled state with the respective through opening 29, and protects the cover plate 23 on the second outer end plate 8 against a rotation in the circumferential direction 10 in this way in the assembled state in the securing state as well as in the release state.

The securing element 28 now cooperates with the respective protrusion 30 on an outer side 31 of the cover plate 23 facing away from the second outer end plate 8 in the securing position, thus in the securing state of FIGS. 1 and 4, in such a way that said protrusion is secured against being pulled out of the respective through opening 29. This securing is thereby preferably realized by means of a positive connection. In the case of the examples shown here, the respective protrusion 30 can optionally have a radial securing opening 32 for this purpose. Complementary thereto, the securing element 28 has at least one securing pin 33, which engages with the securing opening 32 or engages through it on the outer side 31 of the cover plate 23 in the securing position. In the case of the example shown here, the securing element 28 has two securing pins 33 of this type, which each engage with a securing opening 32 in the securing position. The radial dimension of the securing pin 33 is thereby larger than the radial width of the through opening 29, whereby a positive connection results, which makes it impossible to move the respective protrusion 30 axially out of the respective through opening 29.

In the securing position, the securing element 28 is thus secured to the second outer end plate 8 via the protrusions 30. In contrast to this, it can be provided according to the preferred examples shown here that the securing element 28 is secured to the cover plate 23 in the release position, namely preferably in such a way that the cover plate 23 can be removed from the second outer end plate 8 with the help of the securing element 28. The securing element 8 can be used in this way to pull the protective filter element 3 out of the working filter element 2 in the release position. Assembly and disassembly can be significantly simplified thereby. The securing of the securing element 28 to the cover plate 23 in the release state can be realized, for example, with the help of at least one holder 34, which is arranged on the cover plate 23 and protrudes axially therefrom. In the case of the examples shown here, exactly two holders 34 of this type, which are located diametrically opposite one another, are embodied on the cover plate 23. The securing element 28 can now cooperate with these holders 34 to secure the securing element 28 to the cover plate 23 in the release position, which can be seen in FIGS. 2, 3, 5, and 8 to 10. For this purpose, the respective holder 34 can optionally have a radial holding opening 35, with which or through which the respective securing pin 33 of the securing element 28 can engage, respectively, to realize the release position.

Figure 9:
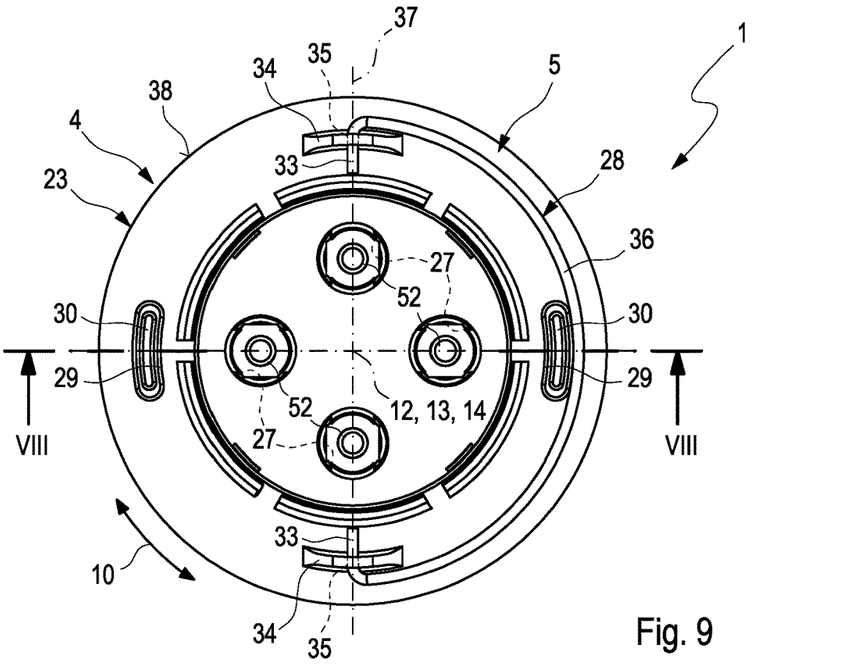
FIG. 9 shows an axial top view onto the filter element group from FIG. 8.

In the case of the preferred example introduced here, the securing element 28 can have a bracket 36, the ends of which are angled and which each form a securing pin 33 of this type. The securing element 28 can be made, for example, of a metal wire. According to a preferred embodiment, the two securing pins 33 of the securing element 28 are spatially oriented in such a way that they define a pivot axis 37, about which the securing element 28 can be pivoted between a working position, which can be seen in FIGS. 1 to 3, 5, 8, and 10, and a resting position, which is shown in FIGS. 4 and 9, in the securing position and also in the release position. In the working position, the securing element 28 can be used to raise the entire filter element group 1, when the securing element 28 assumes the securing position, as in FIGS. 1 and 4. In contrast, when the securing element 28 assumes the release position, as in FIGS. 2, 3, 5, and 8 to 10, the securing element 28 can be used in its working position to lift the assembly device 4 with the protective filter element 3 coupled thereto. In its working position, the securing element 28 thus facilitates the assembly and disassembly of the filter element group 1. In the resting position according to FIGS. 4 and 9, the bracket 36 bears on the annular area 25 of the cover plate 23. The shape of the bracket 36 is thereby selected in such a way that it remains radially within a radial outer circumference 38 of the annular area 25 or of the cover plate 23, respectively, in the resting position. In the resting position, the bracket 36 bears in particular on the outer side 31 of the cover plate 23 radially between said outer circumference 38 and the holders 34 in the securing position or radially between the outer circumference 38 and the through openings 29, respectively, in the release position.

To be able to simultaneously realize the through openings 29 and the holders 34 on the cover plate 23, they are advantageously arranged offset to one another in the circumferential direction 10. In the preferred example, the through openings 29 are offset by 90° with respect to the holders 34 in the circumferential direction 10.

Due to its geometric shape, the securing element 28 is flexible, so that it can be bent open manually in the elastic area, so as to be able to pull the securing pins 33 out of the securing openings 32 or out of the holding openings 35, respectively. The securing element 28 can thereby easily be moved manually between the securing position and the release position.

In the case of the embodiment shown in FIGS. 1 and 3, the working filter body 6 extends continuously from the first outer end plate 7 to the second outer end plate 8. In contrast, FIGS. 2 and 8 show a different embodiment, in the case of which the working filter body 6 has a ring-shaped main filter body 39 and a ring-shaped fine filter body 40. In the case of this embodiment, an intermediate plate 41 is further provided. The main filter body 39 extends from the first outer end plate 7 to the intermediate plate 41. The fine filter body 40 extends from the intermediate plate 41 to the second outer end plate 8. Advantageously, the intermediate plate 41 is firmly connected to the axial ends of the main filter body 39 and of the fine filter body 40, which abut thereon, in particular adhered thereto.

While the protective filter body 15 serves to retain relatively coarse impurities, the main filter body 6 is to filter relatively small impurities out of the fluid. In the case of the two-stage working filter body 6 of FIGS. 2 and 8, the main filter body 39 and the fine filter body 40 also have different filtration effects. The fine filter body 40 is to thereby filter smaller impurities out of the fluid than the main filter body 39. The fine filter body 40 thus usually has a larger flow-through resistance, so that only a comparatively small partial flow, so-called bypass flow, of the fluid flows through the fine filter body 40 in response to a parallel connection of main filter body 39 and fine filter body 40, while the larger remainder, so-called main flow, of the fluid flows through the main filter body 39. Due to this main flow-bypass flow arrangement, however, a highly efficient filtration effect for small impurities can be attained as a whole in the respective fluid circuit via the main filter body 39 and for smallest impurities via the fine filter body 40.

Figure 6:
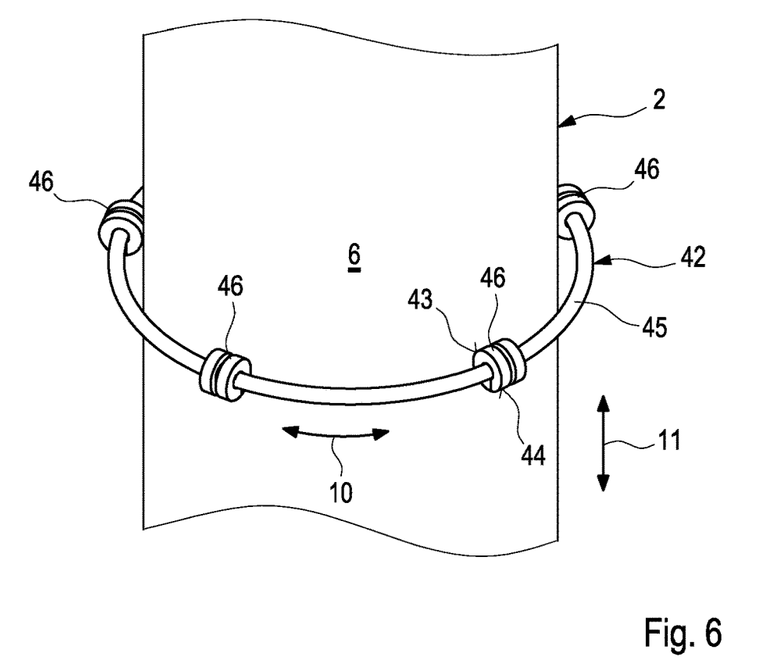
FIG. 6 shows an isometric detail view of the filter element group from FIG. 1 in the area of a spacer device.
Figure 7:
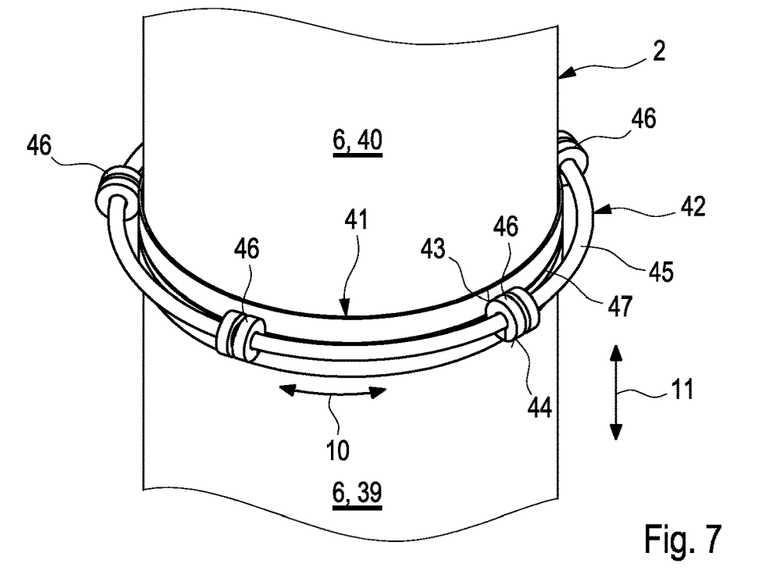
FIG. 7 shows an isometric detail view as in FIG. 6, but in the embodiment shown in FIG. 2.

When using the filter element group 1 in a filter device, the filter element group 1 is inserted into a filter housing (not shown), which is usually cylindrical, wherein the inner cross section of the filter housing is larger than the outer cross section of the filter element group 1, whereby an annular space is created in the filter housing, which encloses the filter element group 1 in the circumferential direction 10. Due to the fact that the filter element group 1 can be of comparatively large construction in the axial direction 11, it may happen that said annular space does not have a constant gap width, after the insertion of the filter element group 1 in the circumferential direction 10 due to assembly tolerances, in particular of assembly errors. The incoming flow of the working filter body 6 thus becomes asymmetrical, which can ultimately increase the flow resistance and reduce the filtration performance. To avoid this, the filter element group 1 according to FIGS. 6 and 7 can be equipped with a spacer device 42, which is arranged on the outside of the working filter body 6 axially between the first outer end plate 7 and the second outer end plate 8, and which thereby encloses the working filter element 2 in the circumferential direction 10. The spacer device 42 thereby protrudes radially to the outside from the working filter element 6 and can be flown through or flown around axially, respectively, by the fluid to be cleaned between its radial inner circumference 43 and its radial outer circumference 44. The spacer device 42 can thereby be supported on the working filter element 2 radially on the inside, thus with its inner circumference 43. In the example of FIG. 6, the spacer device 42 is supported on the working filter body 6 radially on the inside. In the example of FIG. 7, in contrast, the spacer device 42 is supported on the intermediate plate 41 radially on the inside. It is thereby generally conceivable to form the spacer device 42 integrally on the intermediate plate 41, wherein the spacer device 42 then has a plurality of spacer elements, which are distributed in the circumferential direction 10 and which are formed integrally on the intermediate plate 41 and which protrude radially to the outside from the intermediate plate 41. In the case of the embodiments of FIGS. 6 and 7, the spacer device 42, in contrast, is realized as separate device, so that it has an elastic ring 45, which is separate with respect to the working filter element 2, for example of a rubber-elastic plastic, and a plurality of separate spacer elements 46, which are threaded onto the ring 45. The spacer elements 46 are thereby arranged on the ring 45 so as to be distributed in the circumferential direction 10, in particular uniformly. The spacer elements 46 are supported radially on the working filter element 2. In the example of FIG. 6, the spacer elements 46 are supported radially on the working filter body 6. In the example of FIG. 7, in contrast, the spacer elements 46 are supported on the intermediate plate 41. The ring 45 can now advantageously bias the spacer elements 46 radially against the working filter element 2, thus in particular against the working filter body 6 or against the intermediate plate 41, respectively. For the better axial positioning of the spacer device 42 on the working filter element 2, the intermediate plate 41 according to FIG. 7 can have a circumferential annular groove 47, with which the roller-shaped spacer elements 46 engage. The radial bias results in an efficient axial positioning of the spacer device 42 on the working filter element 2.

According to FIGS. 3 and 8, the connecting rod 24 can be designed as pipe 48, which preferably has a pipe wall 49, which is provided with a perforation 50. The design of the connecting rod 24 as pipe 48 provides for the transfer of large tensile forces and compressive forces. The perforation 50 thereby leads to a significant weight reduction.

Operating states, in which the working filter body 6 is bypassed by the fluid, so that the fluid only flows through the protective filter body 15, can occur during the operation of the filter element group 1. The protective filter body 15 is designed to retain relatively coarse impurities. In a lubricant and/or coolant circuit, for example, the respective fluid can have a high viscosity at a low temperature, so that an extremely high counter pressure builds up on the working filter body 6. To avoid damages to the working filter element 2, the at least one relief valve 52, which was described further above, can be provided, which opens a bypass for bypassing the working filter body 6, so that viscous, uncleaned fluid can enter into the working filter interior 9. There, it can flow through the significantly coarser protective filter body 15, which only filters out the coarse impurities. If the fluid heats during the operation, the viscosity is reduced and the flow resistance of the working filter body 6 drops, as a result of which the respective relief valve 52 gradually closes until the entire fluid flow flows through the working filter body 6.

During the filtration operation, the working filter body 6 gradually clogs with the impurities, which were filtered out, so that the working filter body 6 or the working filter element 2, respectively, has to be replaced in the course of predetermined maintenance intervals. Due to the fact that the protective filter body 3 is used only in the case of the high viscosity of the fluid, thus comparatively rarely, the protective filter element 3 is routinely still completely functional at the point in time, at which the working filter element 2 has to be replaced, so that it can generally be used for a plurality of maintenance cycles of the working filter element 2. When replacing the working filter element 2, the protective filter element 3 is accordingly removed from the working filter element 2 with the help of the assembly device 4 and is installed into a new or into a cleaned working filter element 2, respectively, whereby the assembled filter element group 1 can then be used in the filter device again.

According to FIG. 10, the second outer end plate 8 can have a collar 53, which protrudes axially to the inside and which encloses the assembly opening 27. The cover plate 23 can have a matching edge 54, which dips axially into the collar 53 and which is sealed against it by means of a seal 55 in the assembled state according to FIG. 10. In the shown example, this seal 55 is inserted into an annular groove 58, which is embodied on the collar 53.

Figure 12:
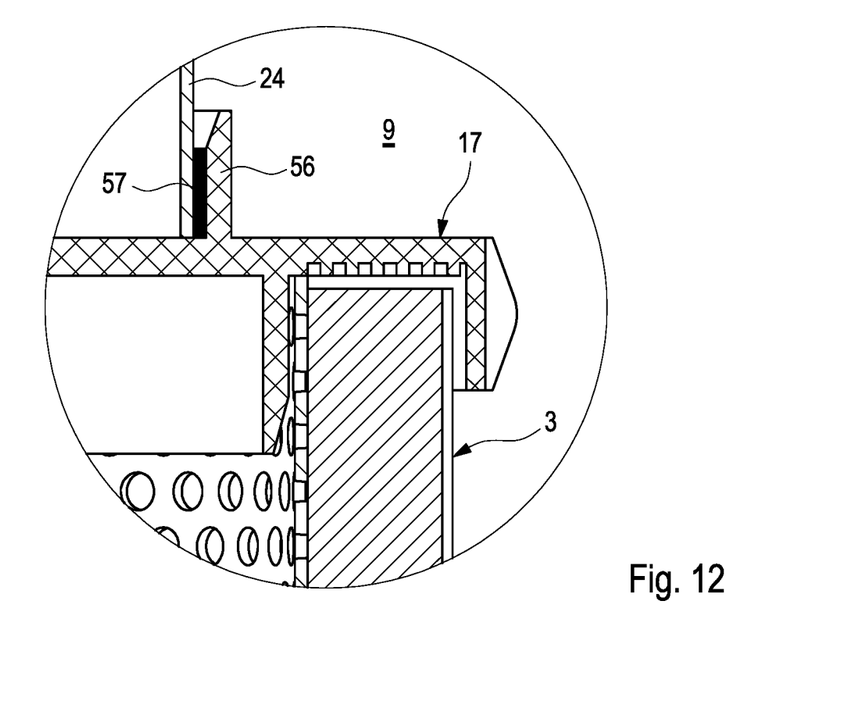
FIG. 12 shows an enlarged detail XII from FIG. 8.

According to FIG. 12, the second inner end plate 17 can have a receiving ring 56, into which the connecting rod 24 is inserted axially. An adhesion 57, for example, can be provided here, so as to firmly connect the connecting rod 24 to the protective filter element 3 or to the second inner end plate 17, respectively.

The invention claimed is:

1. A filter element group for a filter device for filtering a fluid, comprising:
   a ring-shaped working filter element including a ring-shaped working filter body, a first outer end plate, and a second outer end plate;
   a ring-shaped protective filter element including a ring-shaped protective filter body, a first inner end plate, and a second inner end plate;
   an assembly device;
   a securing device;
   the working filter body configured such that the fluid is flowable radially therethrough;
   the working filter body enclosing a working filter interior in a circumferential direction, having a first axial end supporting the first outer end plate, and having a second axial end supporting the second outer end plate;
   the protective filter element arranged in the working filter interior the protective filter body configured such that the fluid is flowable radially therethrough;
   the protective filter body enclosing a protective filter interior in the circumferential direction, having a first axial end supporting the first inner end plate, and having a second axial end supporting the second inner end plate;
   the first outer end plate structured as an open end plate including a fluid outlet opening;
   the first inner end plate structured as an open end plate including a connecting opening;
   the first inner end plate arranged on the first outer end plate such that the protective filter interior is fluidically connected to the fluid outlet opening via the connecting opening;
   the second outer end plate structured as an open end plate including an assembly opening via which the protective filter element is insertable into and removable from the working filter interior;
   the assembly device including a cover plate and a connecting rod;
   the cover plate having an annular area that is circumferential in the circumferential direction and abuts axially on an outside of the second outer end plate;
   the second inner end plate configured as a closed end plate connected in a tension-resistant manner and a pressure-resistant manner to the cover plate via the connecting rod;
   wherein the securing device is adjustable between a securing state where the cover plate is axially secured to the second outer end plate and a release state where the cover plate is axially removable from the second outer end plate;
   wherein, when in the securing state, the securing device secures the cover plate to the second outer end plate preventing rotation of the cover plate in the circumferential direction;
   wherein the securing device includes at least one axial through opening disposed in the annular area of the cover plate, and on the second outer end plate, the securing device includes at least one axially protruding protrusion that extends axially at least one of into and through the at least one through opening; and
   wherein the at least one protrusion cooperates with the at least one through opening when the securing device is in the securing state to mechanically block a rotation between the cover plate and the second outer end plate in the circumferential direction.

2. The filter element group according to claim 1, wherein:
   the securing device further includes a securing element structured separately with respect to each of the cover plate and the second outer end plate;
   the securing element is adjustable between a securing position and a release position and adjusts relative to the cover plate and relative to the second outer end plate;
   the securing element is disposed in the securing position when the securing device is in the securing state; and
   the securing element is disposed in the release position when the securing device is in the release state.

3. The filter element group according to claim 2, wherein, when the securing device is in the securing position, the securing element cooperates with the at least one protrusion on an outer side of the cover plate facing away from the second outer end plate, and prevents removal of the at least one protrusion from the at least one through opening.

4. The filter element group according to claim 3, wherein:
   the at least one protrusion includes a radial securing opening; and
   the securing element includes at least one securing pin that at least one of engages with the securing opening and engages through the securing opening on the outer side of the cover plate when the securing element is in the securing position.

5. The filter element group according to claim 4, wherein:
   the at least one through opening includes two through openings arranged diametrically opposite one another on the cover plate;
   the at least one protrusion includes two protrusions arranged diametrically opposite one another on the second outer end plate; and the at least one securing pin includes two securing pins that each cooperate with one of the two protrusions and engage with the securing opening thereof when the securing element is in the securing position.

6. The filter element group according to claim 5, wherein the securing element includes a bracket, the bracket having ends that each form one of the two securing pins.

7. The filter element group according to claim 6, wherein:
the two securing pins define a pivot axis about which the securing element is pivotable between a working position for (i) lifting the filter element group when the securing element is in the securing position and (ii) lifting the assembly device and the protective filter element when the securing element is in the release position, and a resting position where the bracket bears on the annular area of the cover plate; and
the bracket is structured and arranged such that the bracket remains radially within a radial outer circumference of the cover plate when the securing element is in the resting position.

8. The filter element group according to claim 2, wherein the securing element, when in the release position, is secured to the cover plate such that the cover plate is removable from the second outer end plate via the securing element.

9. The filter element group according to claim 8, wherein the cover plate includes at least one axially protruding holder structured and arranged to cooperate with the securing element when the securing element is in the release position to secure the securing element to the cover plate.

10. The filter element group according to claim 9, wherein:
the at least one holder has a radial holding opening; and
the securing element includes at least one securing pin that at least one of engages with the holding opening and engages through the holding opening when the securing element is in the release position.

11. The filter element group according to claim 10, wherein:
the at least one holder includes two holders arranged diametrically opposite one another on the cover plate; and
the at least one securing pin includes two securing pins that each cooperate with one of the two holders and engage with the holding opening thereof when the securing element is in the release position.

12. The filter element group according to claim 9, wherein the at least one holder includes two holders arranged diametrically opposite one another on the cover plate.

13. The filter element group according to claim 2, wherein:
the securing element, when in the release position, is secured to the cover plate such that the cover plate is removable from the second outer end plate via the securing element;
the cover plate includes at least one axially protruding holder structured and arranged to cooperate with the securing element when the securing element is in the release position to secure the securing element to the cover plate; and
the at least one holder is arranged offset with respect to the at least one through opening in the circumferential direction.

14. The filter element group according to claim 13, wherein:
the securing element engages with the at least one protrusion when the securing element is in the securing position;
the securing element engages with the at least one holder when the securing element is in the release position; and
the securing element is manually transferable between the securing position and the release position.

15. The filter element group according to claim 1, wherein:
the at least one through opening includes two through openings arranged diametrically opposite one another on the cover plate; and
the at least one protrusion includes two protrusions arranged diametrically opposite one another on the second outer end plate.

16. The filter element group according to claim 1, wherein the working filter body extends continuously from the first outer end plate to the second outer end plate.

17. The filter element group according to claim 1, wherein:
the working filter body includes a ring-shaped main filter body and a ring-shaped fine filter body;
the main filter body extends from the first outer end plate to an intermediate plate; and
the fine filter body extends from the intermediate plate to the second outer end plate.

18. The filter element group according to claim 1, characterized in that the connecting rod is structured as a pipe.

19. The filter element group according to claim 18, wherein a pipe wall of the pipe is perforated.

20. A filter element group for a filter device for filtering a fluid, comprising:
a ring-shaped working filter element including a ring-shaped working filter body, a first outer end plate, and a second outer end plate;
a ring-shaped protective filter element including a ring-shaped protective filter body, a first inner end plate, and a second inner end plate;
an assembly device;
a securing device;
the working filter body configured such that the fluid is flowable radially therethrough;
the working filter body enclosing a working filter interior in a circumferential direction, having a first axial end supporting the first outer end plate, and having a second axial end supporting the second outer end plate;
the protective filter element arranged in the working filter interior the protective filter body configured such that the fluid is flowable radially therethrough;
the protective filter body enclosing a protective filter interior in the circumferential direction, having a first axial end supporting the first inner end plate, and having a second axial end supporting the second inner end plate;
the first outer end plate structured as an open end plate including a fluid outlet opening;
the first inner end plate structured as an open end plate including a connecting opening;
the first inner end plate arranged on the first outer end plate such that the protective filter interior is fluidically connected to the fluid outlet opening via the connecting opening;
the second outer end plate structured as an open end plate including an assembly opening via which the protective filter element is insertable into and removable from the working filter interior;
the assembly device including a cover plate and a connecting rod;

the cover plate having an annular area that is circumferential in the circumferential direction and abuts axially on an outside of the second outer end plate;

the second inner end plate configured as a closed end plate connected in a tension-resistant manner and a pressure-resistant manner to the cover plate via the connecting rod;

wherein the securing device is adjustable between a securing state where the cover plate is axially secured to the second outer end plate and a release state where the cover plate is axially removable from the second outer end plate;

wherein, when in the securing state, the securing device secures the cover plate to the second outer end plate preventing rotation of the cover plate in the circumferential direction; and a spacer device that encloses the working filter element in the circumferential direction and protrudes radially away from the working filter element, wherein the fluid is flowable axially through the spacer device between a radial inner circumference and a radial outer circumference of the spacer device, and the spacer device is arranged on an outside of the working filter body axially between the first outer end plate and the second outer end plate.

21. The filter element group according to claim 20, wherein:

the working filter body includes a ring-shaped main filter body and a ring-shaped fine filter body;

the main filter body extends from the first outer end plate to an intermediate plate;

the fine filter body extends from the intermediate plate to the second outer end plate; and the spacer device is arranged radially on an inside on the intermediate plate.

22. The filter element group according to claim 21, wherein:

the spacer device is disposed integrally on the intermediate plate and includes a plurality of spacer elements; and the plurality of spacer elements are distributed in the circumferential direction and protrude radially to an outside from the intermediate plate.

23. The filter element group according to claim 21, wherein:

the spacer device includes an elastic ring that is structured separately from the working filter element;

the spacer device includes a plurality of separate spacer elements threaded onto the elastic ring and supported radially on the working filter element; and the elastic ring radially biases the plurality of spacer elements against the working filter element.

24. A filter element group for a filter device for filtering a fluid, comprising:

a ring-shaped working filter element including a ring-shaped working filter body, a first outer end plate, and a second outer end plate;

a ring-shaped protective filter element including a ring-shaped protective filter body, a first inner end plate, and a second inner end plate;

an assembly device;

a securing device;

the working filter body configured such that the fluid is flowable radially therethrough;

the working filter body enclosing a working filter interior in a circumferential direction, having a first axial end supporting the first outer end plate, and having a second axial end supporting the second outer end plate;

the protective filter element arranged in the working filter interior the protective filter body configured such that the fluid is flowable radially therethrough;

the protective filter body enclosing a protective filter interior in the circumferential direction, having a first axial end supporting the first inner end plate, and having a second axial end supporting the second inner end plate;

the first outer end plate structured as an open end plate including a fluid outlet opening;

the first inner end plate structured as an open end plate including a connecting opening;

the first inner end plate arranged on the first outer end plate such that the protective filter interior is fluidically connected to the fluid outlet opening via the connecting opening;

the second outer end plate structured as an open end plate including an assembly opening via which the protective filter element is insertable into and removable from the working filter interior;

the assembly device including a cover plate and a connecting rod;

the cover plate having an annular area that is circumferential in the circumferential direction and abuts axially on an outside of the second outer end plate;

the second inner end plate configured as a closed end plate connected in a tension-resistant manner and a pressure-resistant manner to the cover plate via the connecting rod;

wherein the securing device is adjustable between a securing state where the cover plate is axially secured to the second outer end plate and a release state where the cover plate is axially removable from the second outer end plate;

wherein, when in the securing state, the securing device secures the cover plate to the second outer end plate preventing rotation of the cover plate in the circumferential direction;

wherein the securing device includes a securing element structured separately with respect to the cover plate and the second outer end plate, the securing element being adjustable between a securing position and a release position, the securing element disposed in the securing position when the securing device is in the securing state, and the securing element disposed in the release position when the securing device is in the release state;

wherein the securing element, when in the release position, is secured to the cover plate such that the cover plate is removable from the second outer end plate via the securing element; and wherein the cover plate includes at least one axially protruding holder structured and arranged to cooperate with the securing element when the securing element is in the release position to secure the securing element to the cover plate.

* * * * *